Dec. 6, 1955   R. E. ASH   2,725,686
EGG CLEANER

Filed June 21, 1954   2 Sheets-Sheet 1

INVENTOR.
RALPH E. ASH
BY
W. B. Harpman
ATTORNEY

Dec. 6, 1955   R. E. ASH   2,725,686
EGG CLEANER
Filed June 21, 1954   2 Sheets-Sheet 2
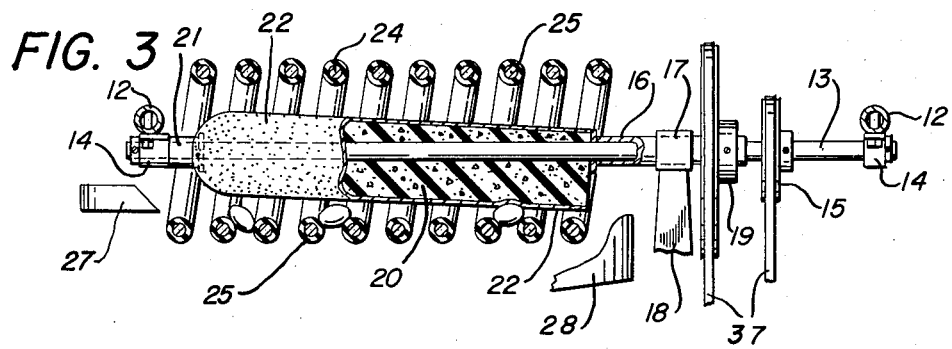
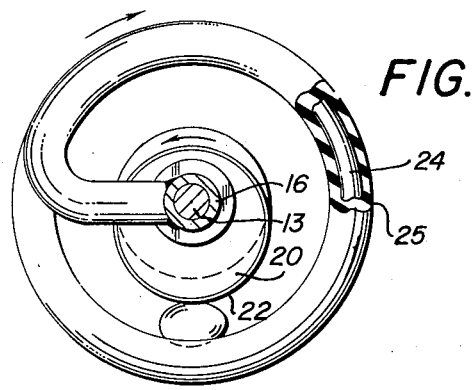
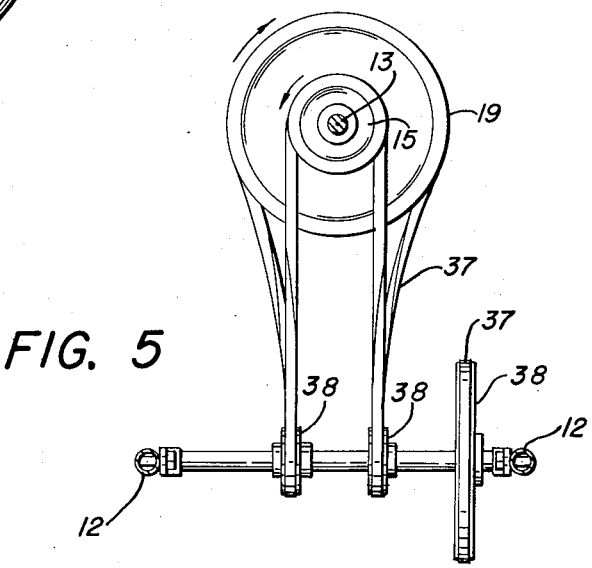
INVENTOR.
RALPH E. ASH
BY
W. B. Harpman
ATTORNEY

United States Patent Office 2,725,686
Patented Dec. 6, 1955

2,725,686

EGG CLEANER

Ralph Eber Ash, Hadley, Pa.

Application June 21, 1954, Serial No. 438,072

3 Claims. (Cl. 51—16)

This invention relates to an egg cleaning machine and more particularly to a machine in which eggs are buffed clean by progressive presentation of the oval surface thereof to suitable buffing means.

The principal object of the invention is the provision of a machine for cleaning eggs.

A further object of the invention is the provision of a machine for progressively rotating and advancing an egg in engagement with a buffing member for cleaning the entire surface of the egg.

A still further object of the invention is the provision of a machine that will safely handle eggs through a cleaning operation.

A still further object of the invention is the provision of a machine for progressively moving eggs through a cleaning cycle and which machine is so designed that in the event an egg is broken, it falls clear of the machine.

The egg cleaning machine disclosed herein comprises an improvement in the art of egg cleaning in that the machine subjects the eggs to a progressive rotating travel while constantly subjecting them to a buffing medium of varying intensity to suitably clean the eggs.

Such machines as have heretofore been known in the art have incorporated water spraying means in an attempt to wash the surface of the eggs. Such machines have been notoriously unsuccessful in operation.

The present invention advances the eggs through a cleaning stage by a softly cushioned spiral which holds the eggs in any position and presents them continuously, with varying degrees of tension, to a rotating buffing member to effectively clean the entire egg and deliver it dry from the machine.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 3 is a vertical section through a portion of the egg cleaning machine taken on line 3—3 of Figure 2.

Figure 4 is a vertical section through a portion of the egg cleaning machine taken on line 4—4 of Figure 1.

Figure 5 is a vertical section of the egg cleaning machine taken on line 5—5 of Figure 1.

Figure 1:
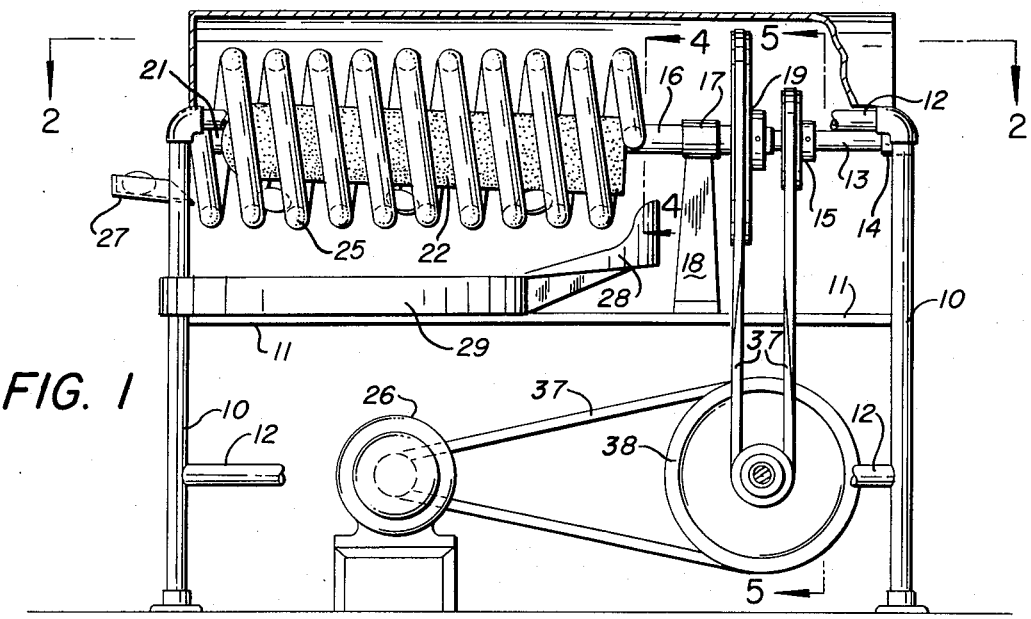
Figure 1 is a side elevation of the egg cleaning machine with parts broken away and parts in cross section.

By referring to the drawings and figures, 1 and 2 in particular, it will be seen that a rectangular frame, comprising legs 10 and horizontally disposed members 12, is provided with a horizontally positioned bottom member 11 and a longitudinally extending shaft 13. The shaft 13 is rotatably mounted in the frame by journals 14—14 secured to the frame members 12 and is adapted to be rotated by a pulley 15 positioned thereon intermediate its ends.

A sleeve 16 is rotatably positioned on the shaft 13 and held against axial movement therealong by means of a journal 17 carried on a transverse bracket 18. One end of the sleeve 16 has a secondary pulley 19 secured thereto so that the sleeve 16 may be rotated on the rotating shaft 13. The shaft 13 forms a means of mounting and moving a buffing roll 20 which is mounted thereon between the sleeve 16 and a secondary sleeve 21 on the other end of the shaft 13.

The buffing roll 20 is primarily formed of foam rubber or equally soft yielding material and covered on its exterior with an abrasive medium 22. By referring to Figures 1 through 4 of the drawings it will be seen that the buffing roll 20 is mounted on the shaft 13 in offcenter relation thereto and is additionally diagonally positioned with respect to the shaft 13 as the bore through the buffing roll 20 is formed diagonally with respect thereto and offcenter axially thereof.

It will thus be seen that the one end of the buffing roll 20 is spaced further from the shaft 13 than the other when the roll is in the position illustrated in Figures 1, 3 and 4 of the drawings.

Figure 2:
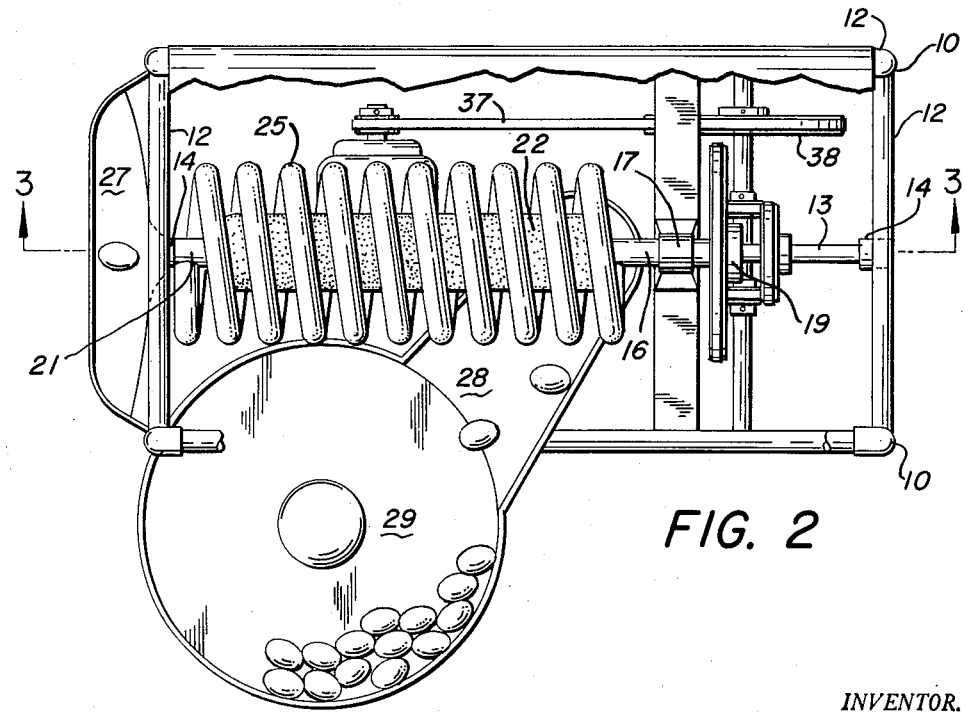
Figure 2 is a top plan view of the egg cleaning machine taken on line 2—2 of Figure 1.

The sleeve 16 and the secondary sleeve 21 are rotatably positioned on the shaft 13 and serve to mount a spiral carrier 24, the ends of which are inturned and secured respectively to the sleeve 16 and the secondary sleeve 21, as best seen in Figures 2 and 4 of the drawings.

The spiral carrier 24 is covered continuously with a foam rubber covering 25 and it will be observed that it is capable of being rotated by the sleeve 16 which in turn is driven by the pulley 19.

It will thus be seen that when the pulleys 15 and 19 are energized, as by means of a motor 26 driving the same through a plurality of belts 37 and an intermediate reducing pulley 38, the shaft 13 and the sleeve 16 will revolve at different velocities, it having been determined that a desirable speed of rotation for the spiral carrier 24 is 9 R. P. M. while that of the buffing roll is 27 R. P. M.

It will be observed that the left end of the buffing roll 20 is rounded so that eggs introduced into the spiral carrier 24, as from a feeding pan 27, will move into position between the buffing roll 20 and the spiral carrier 24 and moved progressively from left to right, as shown in Figures 1, 2 and 3 of the drawings.

During such progressive movement, the eggs will roll continuously in the spiral carrier 24 and on the soft foam rubber covering 25 thereof while they are continuously engaged by the buffing roll 20 and, more particularly, its abrasive covering 22. The eggs will emerge from the right end of the spiral carrier 24 and be received by a receiving pan 28 by means of which they move down an incline by a disc tray 29.

It will occur to those skilled in the art that the disc tray 29 may be revolved, if desired, to present the eggs out from in under the machine and that candling and sorting mechanism may be associated with the disc tray 29 if desired.

It will thus be seen that eggs may be continuously and automatically fed into the machine from the feeding pan 27, that they will progress through the machine, be continuously buffed and cleaned thereby and will be delivered into the receiving pan 28 and onto the disc tray 29 automatically.

The novel arrangement of the buffing roll 20 and the spiral carrier 24 act for the effective cleaning operation of the eggs as the oval shape of the eggs cause them to roll in varying patterns through the carrier 24 and thus present all of their surfaces to the buffing roll 20.

It will thus be seen that the several objects of the invention are met by the egg cleaner disclosed herein.

Having thus described my invention, what I claim is:

1. In an egg cleaning machine a principal shaft mounted for revolving motion, a buffing roll mounted on said principal shaft in diagonal off-center relation therewith, a cushioned spiral carrier positioned about said buffing roll evenly spaced radially with respect to said principal shaft, the area between said buffing roll and said spiral carrier forming a variable passageway for eggs to be cleaned, and means for rotating said buffing roll and spiral carrier to progressively move eggs therebetween.

2. The egg cleaning machine set forth in claim 1 and wherein sleeves are mounted on said principal shaft and the spiral carrier is secured to said sleeves.

3. The egg cleaning machine set forth in claim 1 and wherein the buffing roll is formed of soft resilient material having an abrasive surface covering.

References Cited in the file of this patent

UNITED STATES PATENTS

| 482,937 | Bardsley et al. | Sept. 20, 1892 |
| 665,201 | Fay et al. | Jan. 1, 1901 |
| 1,694,675 | White | Dec. 11, 1928 |

FOREIGN PATENTS

| 675,903 | France | Nov. 18, 1929 |